(12) United States Patent
Veches

(10) Patent No.: US 11,379,299 B2
(45) Date of Patent: *Jul. 5, 2022

(54) SEMICONDUCTOR DEVICE WITH USER DEFINED OPERATIONS AND ASSOCIATED METHODS AND SYSTEMS

(71) Applicant: Micron Technology, Inc., Boise, ID (US)

(72) Inventor: Anthony D. Veches, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/214,684

(22) Filed: Mar. 26, 2021

(65) Prior Publication Data

US 2021/0216397 A1 Jul. 15, 2021

Related U.S. Application Data

(63) Continuation of application No. 16/554,958, filed on Aug. 29, 2019, now Pat. No. 10,963,336.

(51) Int. Cl.
*G06F 11/10* (2006.01)

(52) U.S. Cl.
CPC ...... *G06F 11/1044* (2013.01); *G06F 11/1052* (2013.01); *G06F 11/1056* (2013.01); *G06F 11/1072* (2013.01)

(58) Field of Classification Search
CPC .......... G06F 11/1044; G06F 11/1056; G06F 11/1072; G06F 11/1052
(Continued)

(56) References Cited

U.S. PATENT DOCUMENTS 6,212,631 B1 4/2001 Springer et al.
8,239,732 B2\* 8/2012 Tan ..................... G06F 11/1052
714/765

(Continued)

FOREIGN PATENT DOCUMENTS

KR 20130096753 A 8/2013
KR 20170052576 A 5/2017
KR 20190017223 A 2/2019

OTHER PUBLICATIONS

International Application No. PCT/US2020/044654—International Search Report and Written Opinion, dated Nov. 11, 2020, 10 pages.

(Continued)

*Primary Examiner* — John J Tabone, Jr.
(74) *Attorney, Agent, or Firm* — Perkins Coie LLP

(57) ABSTRACT

Memory devices, systems including memory devices, and methods of operating memory devices are described, in which a memory device may select an option for a host device to access a memory array including a first portion configured to store user data and a second portion configured to store different data based on whether an ECC function of the memory device is enabled or disabled—e.g., storing ECC data when the ECC function is enabled, storing additional user data, metadata, or both when the ECC function is disabled. The host device may disable the ECC function and transmit an input to the memory device as to how to access the memory array. The memory device, based on the input, may select the option for the host device to access the memory array and communicate with the host device in accordance with the selected option.

20 Claims, 5 Drawing Sheets

(58) Field of Classification Search
USPC ........ 714/763, 768, 769, 773, 774, 788, 799
See application file for complete search history.

(56) References Cited

U.S. PATENT DOCUMENTS

| | | | |
|---|---|---|---|
| 8,495,467 B1* | 7/2013 | Billing | G11C 29/44 714/764 |
| 8,898,548 B1 | 11/2014 | Mullendore et al. | |
| 9,594,676 B2 | 3/2017 | Radke et al. | |
| 10,847,246 B2 | 11/2020 | Shin et al. | |
| 2002/0013924 A1* | 1/2002 | Yamamoto | G06F 11/1008 714/763 |
| 2005/0144542 A1 | 6/2005 | Minagawa et al. | |
| 2006/0218467 A1* | 9/2006 | Sibigtroth | G11C 7/1006 714/763 |
| 2008/0072117 A1 | 3/2008 | Syzdek et al. | |
| 2009/0113272 A1* | 4/2009 | Tan | G06F 11/1052 714/765 |
| 2011/0252288 A1 | 10/2011 | Sharon et al. | |
| 2013/0179752 A1 | 7/2013 | Shim et al. | |
| 2014/0229655 A1 | 8/2014 | Goss et al. | |
| 2014/0258811 A1* | 9/2014 | Liu | G06F 11/1044 714/766 |
| 2014/0281808 A1 | 9/2014 | Lam | |
| 2015/0100852 A1* | 4/2015 | Huang | G06F 11/1052 714/773 |
| 2015/0169406 A1 | 6/2015 | Li et al. | |
| 2015/0205665 A1* | 7/2015 | Kuo | G06F 11/1048 714/773 |
| 2018/0336090 A1* | 11/2018 | Minzoni | G06F 11/1044 |
| 2018/0336959 A1 | 11/2018 | Minzoni | |
| 2019/0050316 A1 | 2/2019 | Kim et al. | |
| 2019/0250985 A1 | 8/2019 | Seo et al. | |
| 2020/0151053 A1* | 5/2020 | Cha | G06F 11/1044 |

OTHER PUBLICATIONS

International Application No. PCT/US2020/044656—International Search Report and Written Opinion, dated Oct. 26, 2020, 8 pages.

* cited by examiner

| SETTING | ECC STATE | ECC ACCESS |
|---|---|---|
| 000 (DEFAULT) | ECC ON | INTERNAL ONLY |
| 001 | ECC OFF | NONE |
| 010 | ECC OFF | ADDRESS BITS |
| 011 | ECC OFF | MODE REGISTER OPTION |
| 100 | ECC OFF | ADDITIONAL DQ PINS |
| 101 | ECC OFF | BURST LENGTH |

SEMICONDUCTOR DEVICE WITH USER DEFINED OPERATIONS AND ASSOCIATED METHODS AND SYSTEMS

CROSS-REFERENCE TO RELATED APPLICATION(S)

This application is a continuation of U.S. patent application Ser. No. 16/554,958, filed Aug. 29, 2019; which is incorporated herein by reference in its entirety.

TECHNICAL FIELD

The present disclosure generally relates to semiconductor devices, and more particularly relates to a semiconductor device with user defined operations and associated methods and systems.

BACKGROUND

Memory devices are widely used to store information related to various electronic devices such as computers, wireless communication devices, cameras, digital displays, and the like. Memory devices are frequently provided as internal, semiconductor, integrated circuits and/or external removable devices in computers or other electronic devices. There are many different types of memory, including volatile and non-volatile memory. Volatile memory, including random-access memory (RAM), static random access memory (SRAM), dynamic random access memory (DRAM), and synchronous dynamic random access memory (SDRAM), among others, require a source of applied power to maintain its data. Non-volatile memory, by contrast, can retain its stored data even when not externally powered. Non-volatile memory is available in a wide variety of technologies, including flash memory (e.g., NAND and NOR), phase change memory (PCM), ferroelectric random access memory (FeRAM), resistive random access memory (RRAM), and magnetic random access memory (MRAM), among others. Improving memory devices, generally, may include increasing memory cell density, increasing read/write speeds or otherwise reducing operational latency, increasing reliability, increasing data retention, reducing power consumption, or reducing manufacturing costs, among other metrics.

BRIEF DESCRIPTION OF THE DRAWINGS

FIG. 3 is a table illustrating various options for user defined operations in accordance with an embodiment of the present technology.

DETAILED DESCRIPTION

Figure 1:
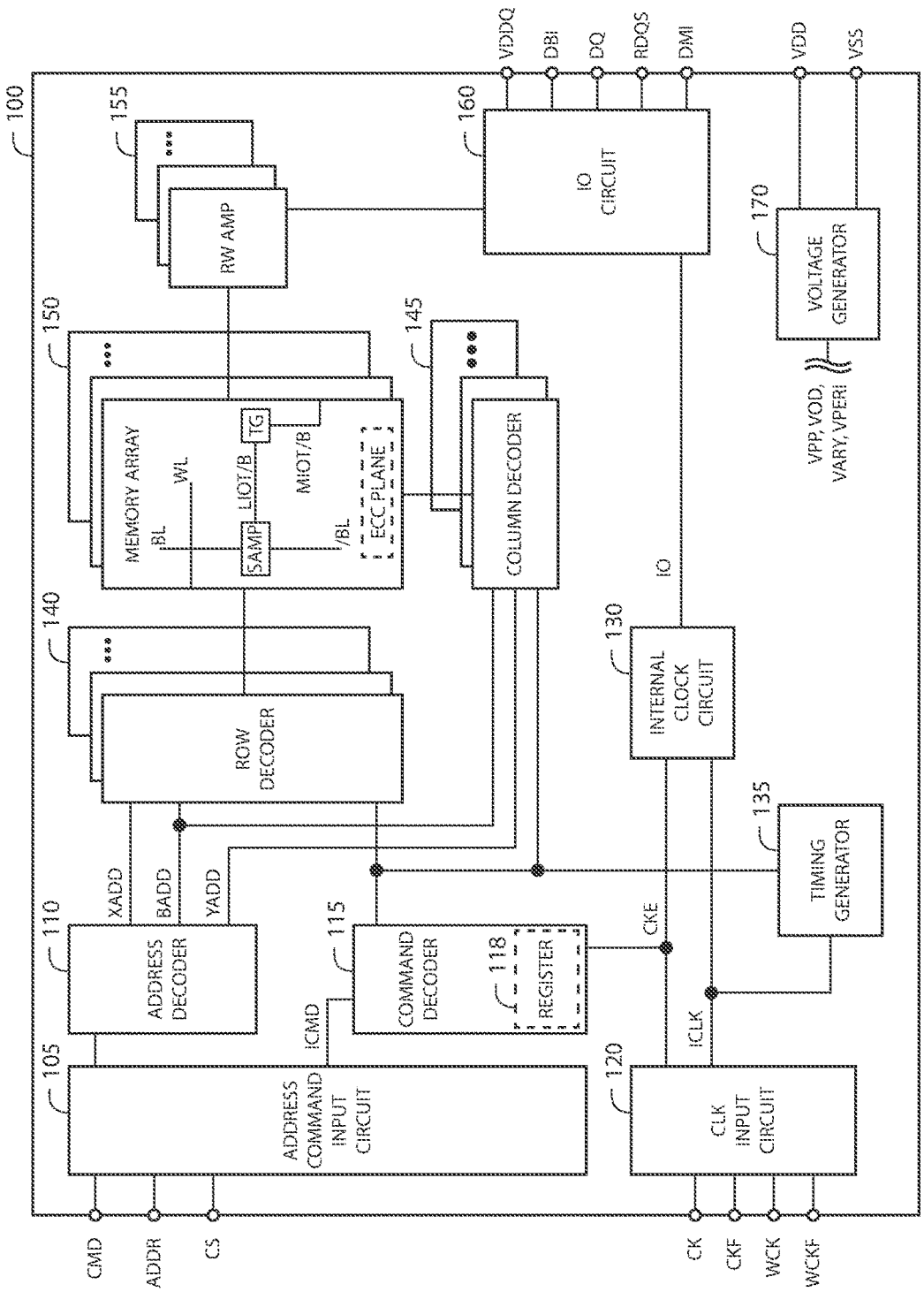
FIG. 1 is a block diagram schematically illustrating a memory device in accordance with an embodiment of the present technology.

A memory device may include error checking and correcting (ECC) functions to generate reliable data—e.g., on-die ECC function. An algorithm, program, or circuitry that performs the ECC function may be referred to as or include aspects of error-correcting codes. Such a memory device may include an ECC circuit and a group of memory cells (e.g., a portion of memory array configured to store ECC parity bits, and which may be variously referred to as an ECC array, an ECC plane, and/or a parity plane) that supports the on-die ECC function. In some embodiments, the group of memory cells may be reserved to internally store ECC data (e.g., internal to the memory device and inaccessible by users) and the specified storage capacity of the memory device may not include the ECC array capacity. In some examples, the ECC array capacity may occupy an appreciable portion of a memory array of the memory device—e.g., approximately 6% of a total memory array space. In some memory systems that include a host device coupled with such memory devices, the host device (or the memory system) may perform its own ECC functions without entirely relying on the on-die ECC function. For example, the host device may be configured to perform a system level ECC function independent of the ECC data or the ECC algorithm of the memory devices. As a result, the on-die ECC function may not be required by the memory system (or the host device) in some embodiments, and the memory device may be configured to provide additional features that may be otherwise unavailable.

Several embodiments of the present technology are directed to memory devices, systems including memory devices, and methods of operating memory devices in which a host device may be configured to disable an ECC function of a memory device and access a memory array of the memory device. In some embodiments, the memory array may include a first portion configured to store user data (e.g., main array, user data plane) and a second portion configured to store error checking and correcting (ECC) data associated with the user data of the first portion (e.g., ECC array, ECC plane, parity plane) when the ECC function of memory device is enabled. As set forth herein, a set of memory addresses may correspond to the memory array where each memory address of the set corresponds to the first portion and to the second portion of the memory array. In one embodiment, the memory device includes a register (e.g., a mode register) to indicate whether the ECC function is enabled or disabled. Further, the register (or a different register) may be configured to store one or more bits corresponding to a set of options for the host device to access the memory array when the ECC function is disabled.

When the ECC function is disabled, the memory device may configure the second portion of the memory array to store additional user data, metadata, or both. Metadata in a memory device may refer to various data associated with operational aspects of the memory device, such as operating temperatures, latency settings, data transmission parameters. In some embodiments, the memory device may store the metadata in one or more registers, to which an output circuit of the memory device has access. In some embodiments, the memory device may store the metadata in the memory array (including the second portion of the memory array reserved for the ECC functionality, when the ECC functionality is disabled). Further, the memory device may bypass an ECC circuit that performs the ECC function for the user data. Additionally or alternatively, the memory device may provide a set of options for the host device to access (e.g., read from, write to, erase portions of, etc.) the memory array, such as accessing the first portion of the memory array only (e.g., disregarding the second portion of the memory array), enabling additional address pins that may separately identify the second portion of the memory array, accessing the second portion of the memory array based on the same set of memory addresses that corresponds to the first portion and to the second portion of the memory array, enabling additional data pins for communicating additional data (e.g., additional user data, metadata) for the second portion of the memory array, determining a different burst length (e.g., an increased burst length) for communicating with the host device, etc.

In some embodiments, the host device may disable the ECC function of the memory device and transmit an input to the memory device as to how the host device may proceed to access the memory array. The memory device may select an option from the set of options based on the input from the host device and update one or more bits in the register based on the selected option. Further, the host device and the memory device may establish a proper protocol to communicate in accordance with the selected option. In some embodiments, the memory device may decode a modified memory address of an access command that utilizes extra address pins corresponding to the second portion. In other embodiments, the memory device may enable extra data pins in the data channels (e.g., bus, interface) to transmit or receive the additional data for the second portion. Further, the memory device may determine a burst length to transmit or receive data including the additional data for the second portion.

A memory device that supports an embodiment of the present technology is described with reference to FIG. 1. More detailed descriptions of the memory device are provided with reference to FIG. 2. FIG. 3 describes a table illustrating various options for user defined operations in accordance with an embodiment of the present technology. A memory system that supports an embodiment of the present technology is described with reference to FIG. 4. A flowchart illustrating a method of operating the memory device is described with reference to FIG. 5.

FIG. 1 is a block diagram schematically illustrating a memory device 100 in accordance with an embodiment of the present technology. The memory device 100 may include an array of memory cells, such as memory array 150. The memory array 150 may include a plurality of banks (e.g., banks 0-15 in the example of FIG. 1), and each bank may include a plurality of word lines (WL), a plurality of bit lines (BL), and a plurality of memory cells (e.g., m×n memory cells) arranged at intersections of the word lines (e.g., m word lines, which may also be referred to as rows) and the bit lines (e.g., n bit lines, which may also be referred to as columns). Memory cells can include any one of a number of different memory media types, including capacitive, magnetoresistive, ferroelectric, phase change, or the like. In some embodiments, a portion of the memory array 150 (e.g., ECC plane) may be configurable to store ECC parity bits. That is, the memory array 150 may include a first subset of memory cells configured to store user-accessible data and a second subset of memory cells (e.g., ECC parity bits) configured to store different kinds of data—e.g., ECC data when an ECC function is enabled, non-ECC data when the ECC function is disabled. The selection of a word line WL may be performed by a row decoder 140, and the selection of a bit line BL may be performed by a column decoder 145. Sense amplifiers (SAMP) may be provided for corresponding bit lines BL and connected to at least one respective local I/O line pair (LIOT/B), which may in turn be coupled to at least one respective main I/O line pair (MIOT/B), via transfer gates (TG), which can function as switches. The memory array 150 may also include plate lines and corresponding circuitry for managing their operation.

In some embodiments, the memory array 150 includes a memory array including a set of memory cells. The set of memory cells may include a first portion configured to store user data. Moreover, the set of memory cells may include a second portion reserved to store ECC data to support the ECC function of the memory device 100. Accordingly, when the ECC functionality is enabled, a host device may not directly access the second portion of the memory array 150. In one embodiment, the memory array 150 may correspond to a set of memory addresses where each memory address of the set is associated with a first portion of the memory array and with a second portion of the memory array. Accordingly, when a memory address is provided by a host device, the memory address may concurrently identify the first portion and the second portion of the memory array 150. When the ECC function is enabled, a host device may rely on the ECC function performed by the memory device 100 using the ECC data in one embodiment. When the ECC function is disabled (e.g., by the host device that performs its own ECC function), however, the memory device 100 may configure the second portion to store additional user data, metadata associated with the memory device 100, or both. Further, the memory device 100 may provide a set of options for the host device to access the memory array 150 as described herein. In some embodiments, the memory device 100 may include one or more registers 118 (e.g., mode registers) configured to indicate whether the ECC function is enabled or disabled. Further, the registers 118 (or a different register) may be configured to store one or more bits corresponding to the set of options for the host device to access the memory array 150 when the ECC function is disabled.

The memory device 100 may employ a plurality of external terminals that include command and address terminals coupled to a command bus and an address bus to receive command signals CMD and address signals ADDR, respectively. The memory device may further include a chip select terminal to receive a chip select signal CS, clock terminals to receive clock signals CK and CKF, data clock terminals to receive data clock signals WCK and WCKF, data terminals DQ, RDQS, DBI (for data bus inversion function), and DMI (for data mask inversion function), power supply terminals VDD, VSS, VDDQ, and VSSQ.

The command terminals and address terminals may be supplied with an address signal and a bank address signal from outside. The address signal and the bank address signal supplied to the address terminals can be transferred, via a command/address input circuit 105, to an address decoder 110. The address decoder 110 can receive the address signals and supply a decoded row address signal (XADD) to the row decoder 140, and a decoded column address signal (YADD) to the column decoder 145. The address decoder 110 can also receive the bank address portion of the ADDR input and supply the decoded bank address signal (BADD) and supply the bank address signal to both the row decoder 140 and the column decoder 145.

The command and address terminals may be supplied with command signals CMD, address signals ADDR, and chip select signals CS, from a memory controller. The command signals may represent various memory commands from the memory controller (e.g., including access commands, which can include read commands and write commands). The chip select signal CS may be used to select the memory device 100 to respond to commands and addresses provided to the command and address terminals. When an active CS signal is provided to the memory device 100, the commands and addresses can be decoded and memory operations can be performed. The command signals CMD may be provided as internal command signals ICMD to a command decoder 115 via the command/address input circuit 105. The command decoder 115 may include circuits to decode the internal command signals ICMD to generate various internal signals and commands for performing memory operations, for example, a row command signal to select a word line and a column command signal to select a bit line. The internal command signals can also include output and input activation commands, such as clocked command CMDCK (not shown in FIG. 1).

The command decoder 115, in some embodiments, may further include one or more registers 118 for tracking various counts or values (e.g., counts of refresh commands received by the memory device 100 or self-refresh operations performed by the memory device 100). In some embodiments, a subset of registers 118 may be referred to as mode registers and configured to store user-defined variables or indications to provide flexibility in performing various functions, features, and modes (e.g., ECC modes). For example, the subset of registers 118 may indicate whether an ECC mode of the memory device is enabled or disabled—e.g., whether the ECC function of the memory device 100 is enabled or disabled. In some examples, the subset of registers 118 (or different registers 118 other than the subset) may be configured to store one or more bits corresponding to a set of options for a host device to access the memory array when the ECC function of the memory device 100 is disabled.

When a read command is issued to a bank with an open row and a column address is timely supplied as part of the read command, read data can be read from memory cells in the memory array 150 designated by the row address (which may have been provided as part of the Activate command identifying the open row) and column address. The read command may be received by the command decoder 115, which can provide internal commands to input/output circuit 160 so that read data can be output from the data terminals DQ, RDQS, DBI, and DMI via read/write amplifiers 155 and the input/output circuit 160 according to the RDQS clock signals. The read data may be provided at a time defined by read latency information RL that can be programmed in the memory device 100, for example, in a mode register (e.g., the register 118). The read latency information RL can be defined in terms of clock cycles of the CK clock signal. For example, the read latency information RL can be a number of clock cycles of the CK signal after the read command is received by the memory device 100 when the associated read data is provided.

When a write command is issued to a bank with an open row and a column address is timely supplied as part of the write command, write data can be supplied to the data terminals DQ, DBI, and DMI according to the WCK and WCKF clock signals. The write command may be received by the command decoder 115, which can provide internal commands to the input/output circuit 160 so that the write data can be received by data receivers in the input/output circuit 160, and supplied via the input/output circuit 160 and the read/write amplifiers 155 to the memory array 150. The write data may be written in the memory cell designated by the row address and the column address. The write data may be provided to the data terminals at a time that is defined by write latency WL information. The write latency WL information can be programmed in the memory device 100, for example, in the mode register (e.g., register 118). The write latency WL information can be defined in terms of clock cycles of the CK clock signal. For example, the write latency information WL can be a number of clock cycles of the CK signal after the write command is received by the memory device 100 when the associated write data is received.

Under the double data rate (DDR) scheme, a data burst having a burst length 2N (e.g., eight (8), sixteen (16), thirty-two (32)) includes 2N bits of data transmitted for each output pin (e.g., each data terminal DQ) of the memory device during N (e.g., four (4), eight (8), sixteen (16)) clock cycles (e.g., WCK and WCKF clock cycles). In some embodiments, the input/output circuit 160 may be configured to communicate with a host device (e.g., transmitting or receiving data via the data terminals DQ) for more than one burst length. For example, when the register (e.g., the mode register) indicates that the ECC function is enabled, the input/output circuit 160 may communicate with the host device for a burst length of sixteen (16) (which may also be referred to as BL16). The burst length (e.g., BL16) may be determined to communicate the user data for the first portion of the memory array 150 during the burst length. Moreover, the input/output circuit 160 may be configured to communicate with the host device for a different burst length (e.g., BL18) when the register indicates that the ECC function is disabled. The different burst length may be determined to communicate the user data for the first portion of the memory array 150 and the additional user data or the metadata for the second portion of the memory array 150 during the different burst length. Although the example described above illustrates an increment in burst length by two (2) that corresponds to one (1) additional clock cycle, the scope of the invention is not limited thereto. In some embodiments, the different burst length may be more than one (1) clock cycle longer than the burst length—e.g., two (2) clock cycles longer, three (3) clock cycles longer, or even more.

The power supply terminals may be supplied with power supply potentials VDD and VSS. These power supply potentials VDD and VSS can be supplied to an internal voltage generator circuit 170. The internal voltage generator circuit 170 can generate various internal potentials VPP, VOD, VARY, VPERI, and the like based on the power supply potentials VDD and VSS. The internal potential VPP can be used in the row decoder 140, the internal potentials VOD and VARY can be used in the sense amplifiers included in the memory array 150, and the internal potential VPERI can be used in many other circuit blocks.

The power supply terminal may also be supplied with power supply potential VDDQ. The power supply potential VDDQ can be supplied to the input/output circuit 160 together with the power supply potential VSS. The power supply potential VDDQ can be the same potential as the power supply potential VDD in an embodiment of the present technology. The power supply potential VDDQ can be a different potential from the power supply potential VDD in another embodiment of the present technology. However, the dedicated power supply potential VDDQ can be used for the input/output circuit 160 so that power supply noise generated by the input/output circuit 160 does not propagate to the other circuit blocks.

The clock terminals and data clock terminals may be supplied with external clock signals and complementary external clock signals. The external clock signals CK, CKF, WCK, WCKF can be supplied to a clock input circuit 120. The CK and CKF signals can be complementary, and the WCK and WCKF signals can also be complementary. Complementary clock signals can have opposite clock levels and transition between the opposite clock levels at the same time. For example, when a clock signal is at a low clock level a complementary clock signal is at a high level, and when the clock signal is at a high clock level the complementary clock signal is at a low clock level. Moreover, when the clock signal transitions from the low clock level to the high clock level the complementary clock signal transitions from the high clock level to the low clock level, and when the clock signal transitions from the high clock level to the low clock level the complementary clock signal transitions from the low clock level to the high clock level.

Input buffers included in the clock input circuit 120 can receive the external clock signals. For example, when enabled by a CKE signal from the command decoder 115, an input buffer can receive the CK and CKF signals and the WCK and WCKF signals. The clock input circuit 120 can receive the external clock signals to generate internal clock signals ICLK. The internal clock signals ICLK can be supplied to an internal clock circuit 130. The internal clock circuit 130 can provide various phase and frequency controlled internal clock signal based on the received internal clock signals ICLK and a clock enable signal CKE from the command decoder 115. For example, the internal clock circuit 130 can include a clock path (not shown in FIG. 1) that receives the internal clock signal ICLK and provides various clock signals to the command decoder 115. The internal clock circuit 130 can further provide input/output (IO) clock signals. The 10 clock signals can be supplied to the input/output circuit 160 and can be used as a timing signal for determining an output timing of read data and the input timing of write data. The 10 clock signals can be provided at multiple clock frequencies so that data can be output from and input to the memory device 100 at different data rates. A higher clock frequency may be desirable when high memory speed is desired. A lower clock frequency may be desirable when lower power consumption is desired. The internal clock signals ICLK can also be supplied to a timing generator 135 and thus various internal clock signals can be generated.

The memory device 100 can be connected to any one of a number of electronic devices capable of utilizing memory for the temporary or persistent storage of information, or a component thereof. For example, a host device of memory device 100 may be a computing device such as a desktop or portable computer, a server, a hand-held device (e.g., a mobile phone, a tablet, a digital reader, a digital media player), or some component thereof (e.g., a central processing unit, a co-processor, a dedicated memory controller, etc.). The host device may be a networking device (e.g., a switch, a router, etc.) or a recorder of digital images, audio and/or video, a vehicle, an appliance, a toy, or any one of a number of other products. In one embodiment, the host device may be connected directly to memory device 100, although in other embodiments, the host device may be indirectly connected to memory device (e.g., over a networked connection or through intermediary devices).

Figure 2:
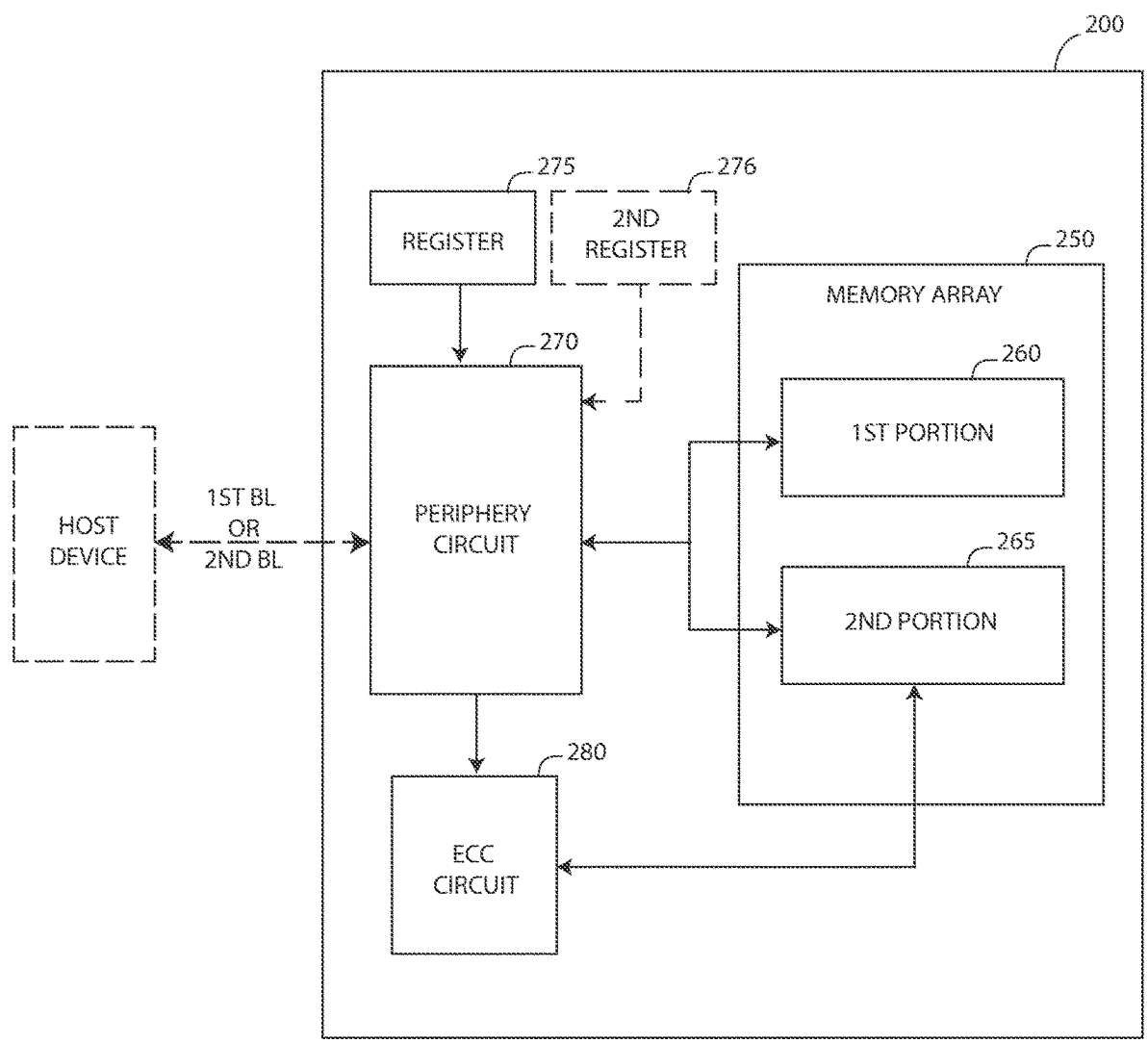
FIG. 2 is a block diagram schematically illustrating a memory device in accordance with an embodiment of the present technology.

FIG. 2 is a block diagram schematically illustrating a memory device 200 in accordance with an embodiment of the present technology. The memory device 200 may be an example or include aspects of the memory device 100 described with reference to FIG. 1. The memory device 200 may include a periphery circuit 270, a register 275, an ECC circuit 280, and a memory array 250. The periphery circuit 270 may include aspects of various components described with reference to FIG. 1. For example, the periphery circuit 270 may include aspects of the command/address input circuit 105, the address decoder 110, the command decoder 115, and the input/output circuit 160, among others. Moreover, the memory array 250 may be an example or include aspects of the memory array 150 described with reference to FIG. 1.

The memory array 250 may include a set of memory cells including a first portion 260 and a second portion 265. Further, the memory array 250 may correspond to a set of memory addresses, where each memory address of the set of memory addresses corresponds to the first portion 260 and to the second portion 265. The first portion 260 may be configured to store user data—e.g., data from the host device. In some embodiments, the first portion 260 may occupy a major portion of the storage capacity of memory array 250—e.g., greater than 90% of the storage capacity in an embodiment. The first portion 260 may represent a portion of the memory array 250 accessible by the host device regardless of whether the on-die ECC function of the memory device 200 is enabled or disabled. In some embodiments, the second portion 265 may be configured to store ECC data that support the on-die ECC function when the on-die ECC function is enabled—hence, the second portion 265 may also be referred to as ECC parity bits or parity plane. The second portion 265 may occupy a relatively minor but appreciable portion of the storage capacity of memory array 250—e.g., approximately 5 to 10% of the storage capacity in an embodiment. In some embodiments, the second portion 265 may be inaccessible by the host device when the ECC function is enabled. In other embodiments, the second portion 265 may be accessible by the host device when the ECC function is enabled such that the host device may access the ECC data.

The second portion 265, however, when the ECC function is disabled, may be configured to store additional user data, metadata associated with the memory device 200, or both. When the second portion 265 is configured to store the additional user data, the memory device 200 may provide an increased storage capacity to the host device—e.g., almost 100% of the entire storage capacity (i.e., the entire storage capacity corresponding to the first portion 260 and the second portion 265). That is, the memory device 200 can provide an extra storage capacity (i.e., the storage capacity corresponding to the second portion 265) to the host device in addition to the storage capacity corresponding to the first portion 260 (which may be referred to as the specified storage capacity of the memory device). Moreover, the first portion 260 and the second portion 265 may provide user data uncorrected by the ECC function of the memory device 200. Such uncorrected user data may provide opportunities for the host device to optimize and/or modify its ECC algorithms should a change in error properties and/or characteristics is detected, in some cases. In some embodiments, the host device may be configured to perform a separate ECC function that is different from the ECC function of the memory device 200.

Additionally or alternatively, the second portion 265 may be configured to store the metadata comprising information related to operational modes of the memory device 200, such as, operating temperatures, latency settings associated with access commands, parameters for data transmissions, test modes, or a combination thereof. In this manner, the memory device 200 may provide the metadata as part of access operations (e.g., read commands directed to the first portion 260) without having to incur commands (e.g., a mode register read (MRR) command) to retrieve the metadata that may be stored otherwise in various registers (e.g., mode registers) of the memory device 200. Such commands retrieving the metadata from the registers may introduce undesirable delay for the memory device 200 because the commands may put the memory device 200 in a specific mode (e.g., "status" mode) resulting in the memory array 250 in a certain condition (e.g., "idle" condition). Consequently, using such commands may be restricted and the host device's visibility to the metadata may also be limited.

In some embodiments, the second portion 265 may be organized to be physically adjacent (or in close proximity) to the first portion 260 such that certain components of the memory device 200 (e.g., row decoder 140, column decoder 145, read/write amplifier 155, sense amplifiers (SAMP)) that support the first portion 260 and the second portion 265 may be shared or efficiently laid out. In other embodiments, the second portion 265 may be organized to be separate from the first portion 260 such that the first portion 260 and the second portion 265 may operate relatively independently of each other—e.g., the first and the second subsets having separate power domain, separate routing of control and/or data paths.

The register 275 (which may also be referred to as a mode register) may be configured to indicate whether an ECC function of the memory device 200 (e.g., on-die ECC function) is enabled or disabled. In some embodiments, a host device coupled with the memory device 200 may perform an ECC function without relying on the on-die ECC function of the memory device 200. In such cases, the register 275 may indicate that the on-die ECC function is disabled (e.g., by the host device) such that the memory device 200 may modify certain operational aspects to provide additional features to the host device. Further, the register 275 may be configured to store one or more bits corresponding to a set of options for the host device to access the memory array 250 when the ECC function is disabled. In some embodiments, the memory device 200 may include an additional register 276 (drawn in phantom in FIG. 2) configured to store one or more bits corresponding to the set of options for the host device to access the memory array 250 when the ECC function is disabled.

The ECC circuit 280 performs an ECC function for the memory device 200 when the ECC function is enabled. The ECC circuit 280 may be coupled with the second portion 265 and perform the ECC function for the user data stored in the first portion 260 using the ECC data stored in the second portion 265. In some embodiments, the ECC circuit 280 may be configured to detect two or more errors and/or to correct one or more errors in the user data. For example, the ECC circuit 280 may detect two bits of errors and correct one bit of error in the user data. In some embodiments, the ECC circuit 280 may be configured to indicate that the user data includes a quantity of errors greater than its detection and correction capability.

The periphery circuit 270 may be configured to control overall aspects of communicating with the host device and accessing the memory array 250. For example, the periphery circuit 270 may receive an input from the host device directed to how the host device may proceed to access the memory array 250 when the ECC function is disabled. The periphery circuit 270 may select an option from a set of options available for the host device based on the input received from the host device. Subsequently, the periphery circuit 270 may update one or more bits in the register 275 (or the second register 276) based on the selected option and carry out an access command from the host device in accordance with the selected option as described in more detail with reference to FIG. 3. In some embodiments, the periphery circuit 270 may bypass the ECC circuit 280 when the ECC function is disabled.

Further, the periphery circuit 270 may communicate with the host device in accordance with the selected option. In some cases, the periphery circuit 270 may communicate with the host device without making any modification in a communication protocol. For example, the periphery circuit 270 may retrieve the user data uncorrected by the ECC function or storing the user data without performing the ECC function—e.g., accessing the first portion 260 without performing the ECC function. In other cases, the periphery circuit 270 may modify the communication protocol to establish a proper environment to communicate with the host device in accordance with the selected option—e.g., activating additional address pins (e.g., terminals) that are otherwise deactivated, enabling additional data pins (e.g., data terminals DQ) in the data channels (e.g., bus, interface), determining a burst length to transmit or receive data. Accordingly, the periphery circuit 270 may be configured to communicate with the host device for more than one burst lengths, in some embodiments.

Although memory devices with memory arrays having first portions occupying greater than 90% of the storage capacity thereof and second portions occupying less than 10% of the storage capacity thereof have been described and illustrated in the foregoing exemplary embodiments, memory devices may be provided with memory arrays having different allocations of storage capacity in other embodiments. For example, first portions having less than 90% of the storage capacity (e.g., 75%, 66%, or even 50% or less) may be provided.

FIG. 3 is a table 300 illustrating various options for user defined operations in accordance with an embodiment of the present technology. The table 300 may be an example of or include aspects of the one or more bits in the register 275 (or the second register 276) configured to store a set of options for the host device to access the memory array 250 when the ECC function of the memory device 200 is disabled. The periphery circuit 270 may update the one or more bits based on a selected option in accordance with an input from the host device. The table 300 illustrates three (3) bits of the register 275 (or the second register 276) in the first column (SETTING column) to list a default condition and five (5) options. As the three bits may represent eight (8) different values (namely, $2^3$ different values), there may be up to two (2) additional options that are not described with reference to the table 300. Although the example described with reference to FIG. 3 includes three (3) bits to indicate a set of options available to the host device to access memory array 250, the scope of the invention is not limited thereto. In some embodiments, the register 275 (or the second register 276) may include a different quantity of bits to represent different set of options—e.g., one (1) bit, two (2) bits, four (4) bits, five (5) bits.

The table 300 further illustrates ECC states in the second column (ECC STATE column) and options for accessing the memory array in the third column (ECC ACCESS column). The ECC STATE indicates whether the ECC function of the memory device 200 is enabled (e.g., the default condition corresponding to the logic state of "000" stored in the register 275 or the second register 276) or disabled (e.g., one of the logic states "001," "010," "011," "100," or "101" stored in the register 275 or the second register 276). The ECC ACCESS provides brief description of options for the host device to access the memory array 250.

The logic state "000" stored in the register 275 (or the second register 276) may correspond to a default condition for the memory device 200 to support access commands from the host device. Under the default condition, the host device may access the memory array 250 with the on-die ECC function enabled—e.g., retrieving user data from the first portion 260 that has been checked by the ECC data in the second portion 265, storing user data at the first portion 260 and associated ECC data (generated by the on-die ECC algorithm) stored at the second portion 265. The memory device 200 operating under the default condition may be regarded to provide a full quality specification.

The logic state "001" stored in the register 275 (or the second register 276) may correspond to a first option for the memory device 200 to support access commands from the host device. Under the first option, the host device may access the memory array 250 by accessing the first portion 260 without having the ECC circuit 280 to perform the on-die ECC function (e.g., the ECC circuit 280 is bypassed or deactivated). Accordingly, the memory device 200 (e.g., the periphery circuit 270) may retrieve user data from the first portion 260 uncorrected by the ECC function or store user data at the first portion 260 without performing the ECC function—e.g., the periphery circuit 270 ignoring the second portion 265 when the logic state stored in the register 275 (or the second register 276) corresponds to "001." In some cases, this option may be regarded as providing a modified quality specification (which may be referred to as operating under a reduced quality specification) when compared to the default condition.

The logic state "010" stored in the register 275 (or the second register 276) may correspond to a second option for the memory device 200 to support access commands from the host device. Under the second option, the host device may access the memory array 250 by accessing both the first portion 260 and the second portion 265 of the memory array 250. As described with reference to FIGS. 1 and 2, each memory address of the set of memory addresses corresponding to the memory array 250 may identify both the first portion 260 and the second portion 265 such that each memory address may identify user data from the first portion 260 and associated ECC data from the second portion 265 under the default condition (e.g., when the ECC function is enabled). As such, the second portion 265 may not have been designated with its own set of memory addresses under the default condition. In some embodiments, however, the memory device 200 may include one or more address pins that are separate from a quantity of address pins corresponding to the set of memory addresses for the memory array 250.

When the logic state stored in the register 275 (or the second register 276) corresponds to "010" (i.e., under the second option), the one or more address pins may be used to identify the second portion 265—e.g., the second portion 265 may be designated with its own set of memory addresses, which may be independent of the first portion 260 of the memory array 250. Accordingly, a memory address associated with an access command may be modified to include a first segment and a second segment, where the first segment of the memory address corresponds to the one or more address pins identifying the second portion 266 and the second segment of the memory address may remain the same as the default condition—e.g., the second segment of the memory address corresponding to a quantity of address pins for the set of memory addresses corresponding to the memory array 250. In this manner, the memory address associated with the access command may be configured to separately identify the second portion 265 independent of the first portion 260 of the memory array 250. Under the second option, the memory device 200 (e.g., periphery circuit 270) may be configured to decode the first segment of the memory address (in addition to decoding the second segment of the memory address) to identify the second portion 265 of the memory array 250 such that the host device may access both the first portion 260 and the second portion 265 of the memory array 250.

The logic state "011" stored in the register 275 (or the second register 276) may correspond to a third option for the memory device 200 to support access commands from the host device. Under the third option, the host device may access the memory array 250 by accessing the second portion 265 in lieu of accessing the first portion 260 of the memory array 250. In other words, the logic state "011" stored in the register 275 (or the second register 276) may function as a flag (or an indicator) for the periphery circuit 270 to access the second portion 265, instead of the first portion 260, based on a memory address associated with an access command for the memory array 250. As described herein, the memory address for the memory array 250 may be configured to identify the first portion 260 for user data and the second portion 265 for ECC data associated with the user data when operating under the default condition. As such, the memory device 200 (e.g., the periphery circuit 270) may be configured to access the second portion 265 of the memory array 250 based on the memory address of the access command instead of accessing the first portion 260 when the logic state stored in the register 275 (or the second register 276) corresponds to "011."

The logic state "100" stored in the register 275 (or the second register 276) may correspond to a fourth option for the memory device 200 to support access commands from the host device. Under the fourth option, the host device may access the memory array 250 by accessing the second portion 265 of the memory array 250 via a first set of data pins (e.g., data terminals DQ) that is separate from a second set of data pins corresponding to the user data for the first portion 260 of the memory array 250. As described herein with reference to FIGS. 1 and 2, the memory array 250 may be configured to communicate data (e.g., user data for the first portion 260 of the memory array 250) via the second set of data pins. In some embodiments, however, the memory device 200 may include the first set of data pins that are separate from the second set of data pins corresponding to the user data for the first portion 260 of the memory array 250. When the logic state "100" is stored in the register 275 (or the second register 276), the memory device 200 (e.g., the periphery circuit 270) may be configured to enable the first set of data pins in addition to (or in lieu of) the second set of data pins such that the memory device 200 may communicate additional data (e.g., additional user data, metadata) for the second portion 265—e.g., transmitting the additional data from the second portion 265 via the first set of data pins, receiving the additional data to store at the second portion 265 via the first set of data pins.

The logic state "101" stored in the register 275 (or the second register 276) may correspond to a fifth option for the memory device 200 to support access commands from the host device. Under the fifth option, the host device may access the memory array 250 by communicating for a burst length that may correspond to the user data for the first portion 260 and additional data for the second portion 265. When the logic state "101" is stored in the register 275 (or the second register 276), the memory device 200 (e.g., periphery circuit 270) may access both the first portion 260 and the second portion 265 of the memory array 250 and determine a burst length for communicating with the host device. The newly determined burst length (e.g., BL18) may be greater that the burst length (e.g., BL16) used under the default condition by a burst length (e.g., BL2) that corresponds to the additional data for the second portion 265.

Figure 4:
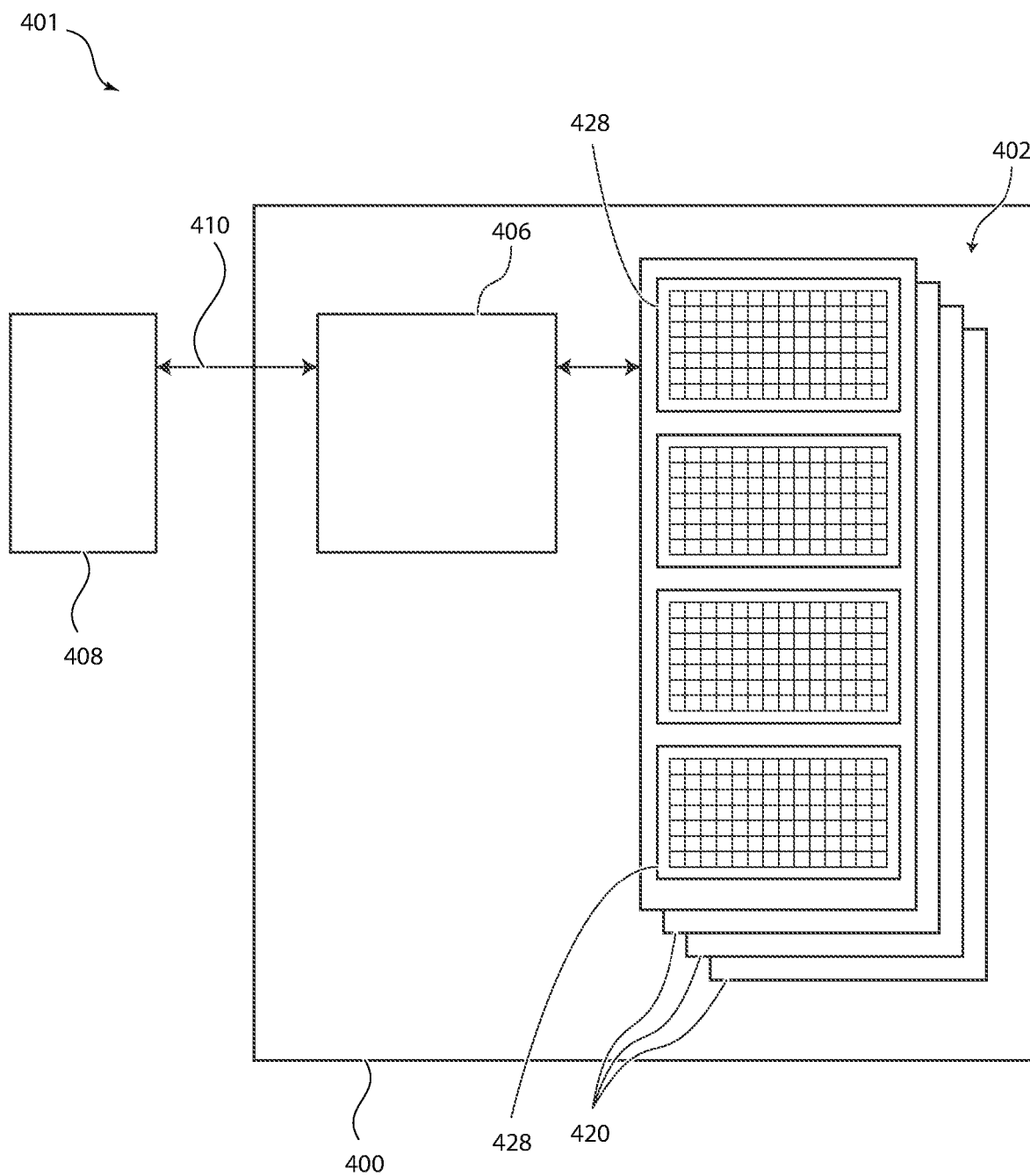
FIG. 4 is a block diagram schematically illustrating a memory system in accordance with an embodiment of the present technology.

FIG. 4 is a block diagram of a system 401 having a memory device 400 configured in accordance with an embodiment of the present technology. The memory device 400 may be an example of or include aspects of the memory devices 100 or 200 described with reference to FIGS. 1 and 2. As shown, the memory device 400 includes a main memory 402 (e.g., DRAM, NAND flash, NOR flash, FeRAM, PCM, etc.) and control circuitry 406 operably coupled to a host device 408 (e.g., an upstream central processor (CPU)). The main memory 402 may be an example of or include aspects of the memory array 150 or 250 described with reference to FIGS. 1 and 2. Further, the control circuitry 406 may be an example of or include aspects of the periphery circuit 270 described with reference to FIG. 2. The main memory 402 includes a plurality of memory units 420, which each include a plurality of memory cells. The memory units 420 can be individual memory dies, memory planes in a single memory die, a stack of memory dies vertically connected with through-silicon vias (TSVs), or the like. For example, in one embodiment, each of the memory units 420 can be formed from a semiconductor die and arranged with other memory unit dies in a single device package. In other embodiments, multiple memory units 420 can be co-located on a single die and/or distributed across multiple device packages. The memory units 420 may, in some embodiments, also be sub-divided into memory regions 428 (e.g., banks, ranks, channels, blocks, pages, etc.).

The memory cells can include, for example, floating gate, charge trap, phase change, capacitive, ferroelectric, magnetoresistive, and/or other suitable storage elements configured to store data persistently or semi-persistently. The main memory 402 and/or the individual memory units 420 can also include other circuit components, such as multiplexers, decoders, buffers, read/write drivers, address registers, data out/data in registers, etc., for accessing and/or programming (e.g., writing) the memory cells and other functionality, such as for processing information and/or communicating with the control circuitry 406 or the host device 408. Although shown in the illustrated embodiments with a certain number of memory cells, rows, columns, regions, and memory units for purposes of illustration, the number of memory cells, rows, columns, regions, and memory units can vary, and can, in other embodiments, be larger or smaller in scale than shown in the illustrated examples. For example, in some embodiments, the memory device 400 can include only one memory unit 420. Alternatively, the memory device 400 can include two, three, four, eight, ten, or more (e.g., 16, 32, 64, or more) memory units 420. Although the memory units 420 are shown in FIG. 4 as including four memory regions 428 each, in other embodiments, each memory unit 420 can include one, two, three, eight, or more (e.g., 16, 32, 64, 100, 128, 256 or more) memory regions.

In one embodiment, the control circuitry 406 can be provided on the same die as the main memory 402 (e.g., including command/address/clock input circuitry, decoders, voltage and timing generators, input/output circuitry, etc.). In another embodiment, the control circuitry 406 can be a microcontroller, special purpose logic circuitry (e.g., a field programmable gate array (FPGA), an application specific integrated circuit (ASIC), control circuitry on a memory die, etc.), or other suitable processor. In one embodiment, the control circuitry 406 can include a processor configured to execute instructions stored in memory to perform various processes, logic flows, and routines for controlling operation of the memory device 400, including managing the main memory 402 and handling communications between the memory device 400 and the host device 408. In some embodiments, the control circuitry 406 can include embedded memory with memory registers for storing, e.g., row counters, bank counters, memory pointers, fetched data, etc. In another embodiment of the present technology, a memory device 400 may not include control circuitry, and may instead rely upon external control (e.g., provided by the host device 408, or by a processor or controller separate from the memory device 400).

The host device 408 can be any one of a number of electronic devices capable of utilizing memory for the temporary or persistent storage of information, or a component thereof. For example, the host device 408 may be a computing device such as a desktop or portable computer, a server, a hand-held device (e.g., a mobile phone, a tablet, a digital reader, a digital media player), or some component thereof (e.g., a central processing unit, a co-processor, a dedicated memory controller, etc.). The host device 408 may be a networking device (e.g., a switch, a router, etc.) or a recorder of digital images, audio and/or video, a vehicle, an appliance, a toy, or any one of a number of other products. In one embodiment, the host device 408 may be connected directly to memory device 400, although in other embodiments, the host device 408 may be indirectly connected to memory device (e.g., over a networked connection or through intermediary devices).

In operation, the control circuitry 406 can directly write or otherwise program (e.g., erase) the various memory regions of the main memory 402. The control circuitry 406 communicates with the host device 408 over a host-device bus or interface 410. In some embodiments, the host-device bus or interface 410 may be configured to carry data bursts having variable burst lengths. For example, the host-device bus or interface 410 may carry data bursts having a first burst length (e.g., BL16) or a second burst length (e.g., BL18, BL20, BL22, BL24) based on whether an ECC function of the memory device 400 is enabled (e.g., BL16) or disabled (e.g., BL18, BL20, BL22, BL24). In some embodiments, the host device 408 and the control circuitry 406 can communicate over a dedicated memory bus (e.g., a DRAM bus). In other embodiments, the host device 408 and the control circuitry 406 can communicate over a serial interface, such as a serial attached SCSI (SAS), a serial AT attachment (SATA) interface, a peripheral component interconnect express (PCIe), or other suitable interface (e.g., a parallel interface). The host device 408 can send various requests (in the form of, e.g., a packet or stream of packets) to the control circuitry 406. A request can include a command to read, write, erase, return information, and/or to perform a particular operation (e.g., a refresh operation, a TRIM operation, a precharge operation, an activate operation, a wear-leveling operation, a garbage collection operation, etc.).

In some embodiments, the control circuitry 406 can be configured to track operations (e.g., read operations, write operations, erase operations, activate operations, etc.) performed in the main memory 402 (e.g., in a register or table in an embedded memory of the control circuitry 406) in multiple memory units 420 to facilitate performing refresh operations on an as-needed basis. In this regard, the control circuitry 406 can be configured to compare the number or rate of operations experienced by different memory units 420 and to perform or schedule refresh operations on the memory units 420 based on a comparison between the number or rate of operations experienced by the memory units 420. Alternatively, the control circuitry 406 can be configured to perform or schedule refresh operations on the memory units 420 based on a comparison of each memory unit 420 to one or more predetermined thresholds (e.g., threshold numbers of operations, threshold rates of operations, etc.). Accordingly, a memory unit 420 which is the target of operations that exceed a threshold number or rate can be refreshed more frequently than another unit 420, due to the freedom with which different units 420 can be subjected to out-of-order refresh operations.

In some embodiments, the memory system 401 may include the host device 408, a memory device 400 that includes a memory array (e.g., main memory 402) corresponding to a set of memory addresses, where each memory address of the set of memory addresses is associated with a first portion of the memory array configured to store user data and with a second portion of the memory array configured to store ECC data associated with the user data of the first portion when the ECC function of the memory device 400 is enabled. The memory device 400 further includes a register configured to store one or more bits corresponding to a set of options for the host device to access the memory array when the ECC function is disabled.

In some embodiments, the host device 408 may be configured to transmit an input directed to the set of options to access the memory array. Further, the memory device 400 may be configured to select an option from the set of options based on the input from the host device 408, update the one or more bits in the register based on the selected option, and communicate with the host device 408 in accordance with the selected option. In some embodiments, the host device 408 may be configured to perform a separate ECC function that is different from the ECC function of the memory device 400. In some cases, the host device 408 may be configured to generate a memory address including a first segment and a second segment, where the first segment of the memory address corresponds to one or more address pins that are separate from a quantity of address pins corresponding to the second segment for the set of memory addresses.

In some embodiments, the host device 408 may be configured to activate one or more channels associated with a first set of data pins of the memory device 400, where the first set of data pins corresponds to additional data for the second portion and is separate from a second set of data pins corresponding to the user data for the first portion of the memory array. In some embodiments, the host device 408 may be configured to communicate with the memory device 400 for a burst length corresponding to the user data for the first portion and additional data for the second portion.

Figure 5:
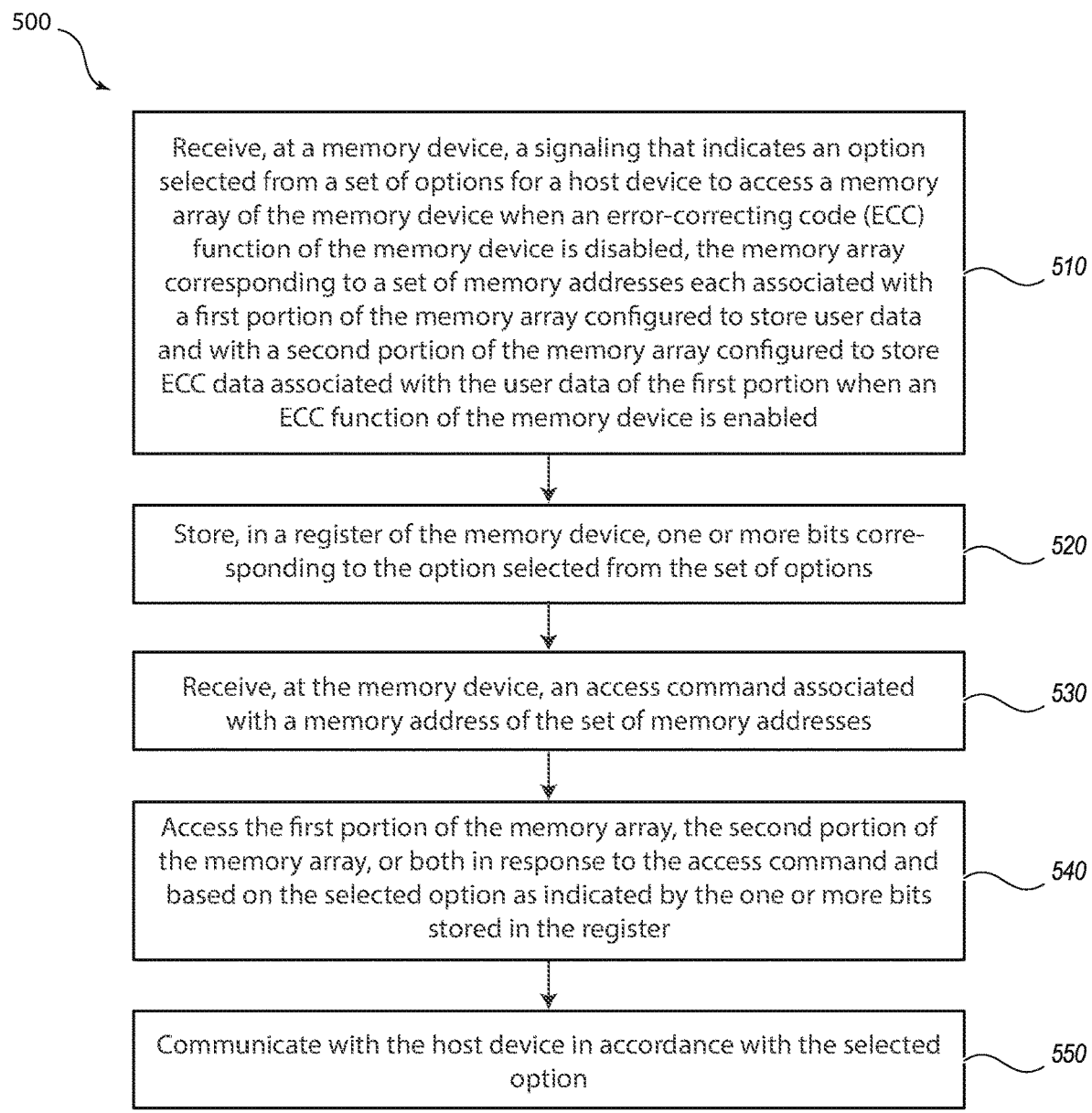
FIG. 5 is a flow chart illustrating a method of operating a memory device in accordance with an embodiment of the present technology.

FIG. 5 is a flow chart 500 illustrating a method of operating a memory device in accordance with an embodiment of the present technology. The flow chart 500 may be an example of or include aspects of a method that the memory device 200 (or the periphery circuit 270 of the memory device 200) may perform as described with reference to FIG. 2. Such memory device may include a memory array (e.g., the memory array 250 of the memory device 200) corresponding to a set of memory addresses, where each memory address of the set of memory addresses is associated with a first portion (e.g., the first portion 260) of the memory array configured to store user data and with a second portion (e.g., the second portion 265) of the memory array configured to store ECC data associated with the user data of the first portion when an ECC function of the memory device is enabled. Further, the memory device may include a register (e.g., the register 275 or the second register 276 of the memory device 200) configured to store one or more bits corresponding to a set of options for a host device to access the memory array when the ECC function is disabled.

The method includes receiving, at a memory device, a signaling that indicates an option selected from a set of options for a host device to access a memory array of the memory device when an ECC function of the memory device is disabled, the memory array corresponding to a set of memory addresses each associated with a first portion of the memory array configured to store user data and with a second portion of the memory array configured to store ECC data associated with the user data of the first portion when an ECC function of the memory device is enabled (box 510). In accordance with one aspect of the present technology, the receiving feature of box 510 can be performed by the command/address input circuit 105, a periphery circuit (e.g., the periphery circuit 270 of FIG. 2), or control circuitry (e.g., the control circuitry 406 of FIG. 4).

The method further includes storing, in a register of the memory device, one or more bits corresponding to the option selected from the set of options (box 520). In accordance with one aspect of the present technology, the storing feature of box 520 can be performed by the periphery circuit (e.g., the periphery circuit 270 of FIG. 2) or the control circuitry (e.g., the control circuitry 406 of FIG. 4) in conjunction with a register (e.g., the register 275 of FIG. 2).

The method further includes receiving, at the memory device, an access command associated with a memory address of the set of memory addresses (box 530). In accordance with one aspect of the present technology, the receiving feature of box 530 can be performed by the command/address input circuit 105, a periphery circuit (e.g., the periphery circuit 270 of FIG. 2), or control circuitry (e.g., the control circuitry 406 of FIG. 4).

The method further includes accessing the first portion of the memory array, the second portion of the memory array, or both in response to the access command and based on the selected option as indicated by the one or more bits stored in the register (box 540). In accordance with one aspect of the present technology, the accessing feature of box 540 can be performed by the periphery circuit (e.g., the periphery circuit 270 of FIG. 2) or the control circuitry (e.g., the control circuitry 406 of FIG. 4) in conjunction with an address decoder, a row decoder, a column decoder, and a read/write amplifier (e.g., the address decoder 110, the row decoder 140, the column decoder 145, and the read/write amplifier 155 of FIG. 1).

The method further includes communicating with the host device in accordance with the selected option (box 550). In accordance with one aspect of the present technology, the communicating feature of box 550 can be performed by the periphery circuit (e.g., the periphery circuit 270 of FIG. 2) or the control circuitry (e.g., the control circuitry 406 of FIG. 4) in conjunction with an input/output circuit (e.g., the input/output circuit 160 of FIG. 1).

The method can further include decoding a first segment of the memory address associated with the access command to identify the second portion of the memory array. In some embodiments, the first segment corresponds to one or more address pins that are separate from a quantity of address pins corresponding to the plurality of memory addresses. In accordance with one aspect of the present technology, the decoding feature can be performed by the periphery circuit (e.g., the periphery circuit 270 of FIG. 2) or the control circuitry (e.g., the control circuitry 406 of FIG. 4) in conjunction with an address decoder, a row decoder, and a column decoder (e.g., the address decoder 110, the row decoder 140, and the column decoder 145 of FIG. 1).

In some embodiments, accessing the first portion of the memory array includes retrieving the user data uncorrected by the ECC function or storing the user data without performing the ECC function. In some embodiments, accessing the second portion of the memory array may be based on the memory address associated with the access command. In accordance with one aspect of the present technology, the accessing feature can be performed by the periphery circuit (e.g., the periphery circuit 270 of FIG. 2) or the control circuitry (e.g., the control circuitry 406 of FIG. 4) in conjunction with an address decoder, a row decoder, a column decoder, and a read/write amplifier (e.g., the address decoder 110, the row decoder 140, the column decoder 145, and the read/write amplifier 155 of FIG. 1).

The method can further include enabling a first set of data pins corresponding to additional data for the second portion of the memory array. In accordance with one aspect of the present technology, the enabling feature can be performed by the periphery circuit (e.g., the periphery circuit 270 of FIG. 2) or the control circuitry (e.g., the control circuitry 406 of FIG. 4) in conjunction with an input/output circuit (e.g., the input/output circuit 160 of FIG. 1).

The method can further include determining a burst length for communicating with the host device, where the burst length corresponds to the user data for the first portion and additional data for the second portion. In accordance with one aspect of the present technology, the enabling feature can be performed by the periphery circuit (e.g., the periphery circuit 270 of FIG. 2) or the control circuitry (e.g., the control circuitry 406 of FIG. 4).

It should be noted that the methods described above describe possible implementations, and that the operations and the steps may be rearranged or otherwise modified and that other implementations are possible. Furthermore, embodiments from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The devices discussed herein, including a memory device, may be formed on a semiconductor substrate or die, such as silicon, germanium, silicon-germanium alloy, gallium arsenide, gallium nitride, etc. In some cases, the substrate is a semiconductor wafer. In other cases, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

The functions described herein may be implemented in hardware, software executed by a processor, firmware, or any combination thereof. Other examples and implementations are within the scope of the disclosure and appended claims. Features implementing functions may also be physically located at various positions, including being distributed such that portions of functions are implemented at different physical locations.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

From the foregoing, it will be appreciated that specific embodiments of the invention have been described herein for purposes of illustration, but that various modifications may be made without deviating from the scope of the invention. Rather, in the foregoing description, numerous specific details are discussed to provide a thorough and enabling description for embodiments of the present technology. One skilled in the relevant art, however, will recognize that the disclosure can be practiced without one or more of the specific details. In other instances, well-known structures or operations often associated with memory systems and devices are not shown, or are not described in detail, to avoid obscuring other aspects of the technology. In general, it should be understood that various other devices, systems, and methods in addition to those specific embodiments disclosed herein may be within the scope of the present technology.

What is claimed is:

1. An apparatus comprising:
a memory array including a first portion configured to store user data and a second portion configured to store error checking and correcting (ECC) data;
a register configured to store one or more bits indicating options for a host device to access the memory array when an ECC function of the apparatus is disabled; and
circuitry configured to:
receive an input from the host device selecting one of the options;
update the one or more bits in the register based on the input; and
communicate with the host device in accordance with the one or more bits updated in the register.

2. The apparatus of claim 1, wherein the circuitry is further configured to store additional user data, metadata, or both in the second portion when the ECC function is disabled, the metadata including an operating temperature of the apparatus, a latency setting for accessing the memory array, a parameter for transmitting data, or a combination thereof.

3. The apparatus of claim 1, wherein the register is further configured to indicate that the ECC function is disabled in response to receiving a command from the host device disabling the ECC function.

4. The apparatus of claim 1, wherein the selected option corresponds to retrieving the user data uncorrected by the ECC function or storing the user data without performing the ECC function.

5. The apparatus of claim 1, wherein the selected option corresponds to accessing the second portion of the memory array based on decoding a memory address of an access command directed to the memory array.

6. The apparatus of claim 1, wherein the selected option corresponds to enabling one or more address pins identifying the second portion of the memory array, the one or more address pins separate from a quantity of address pins corresponding to a plurality of memory addresses for the memory array.

7. The apparatus of claim 1, wherein the selected option corresponds to enabling one or more data pins configured to transmit or receive data for the second portion of the memory array, wherein the one or more data pins separate from a quantity of data pins configured to transmit or receive data for the first portion of the memory array.

8. The apparatus of claim 1, wherein the selected option corresponds to determining a burst length for communicating with the host device, the burst length corresponding to the user data for the first portion and additional user data and/or metadata for the second portion.

9. A method comprising:
receiving, at a memory device, an input from a host device selecting one of options for the host device to access a memory array of the memory device when an error checking and correcting (ECC) function of the memory device is disabled, the memory array including a first portion configured to store user data and a second portion configured to store ECC data;
storing, in a register of the memory device, one or more bits corresponding to the selected option;
receiving, after storing the one or more bits in the register, an access command directed to the memory array from the host device;
accessing the first portion, the second portion, or both in response to receiving the access command and based at least in part on the one or more bits stored in the register; and
communicating with the host device in accordance with the selected option.

10. The method of claim 9, further comprising:
receiving, from the host device, a command disabling the ECC function, prior to receiving the input selecting one of the options.

11. The method of claim 9, further comprising:
decoding a first segment of a memory address associated with the access command to identify the second portion of the memory array.

12. The method of claim 9, wherein accessing the first portion of the memory array comprises retrieving the user data uncorrected by the ECC function or storing the user data without performing the ECC function.

13. The method of claim 9, further comprising:
enabling one or more address pins identifying the second portion of the memory array, the one or more address pins separate from a quantity of address pins corresponding to a plurality of memory addresses for the memory array.

14. The method of claim 9, further comprising:
enabling one or more data pins configured to transmit or receive data for the second portion of the memory array, wherein the one or more data pins separate from a quantity of data pins configured to transmit or receive data for the first portion of the memory array.

15. A memory system comprising:
a host device; and
a memory device including:
a memory array having a first portion configured to store user data and a second portion configured to store error checking and correcting (ECC) data; and
a register configured to store one or more bits indicating options for the host device to access the memory array when an ECC function of the memory device is disabled;
wherein the host device is configured to transmit an input selecting one of the options to access the memory array, and
wherein the memory device is configured to:
receive the input from the host device;
update the one or more bits in the register based on the input; and
communicate with the host device in accordance with the one or more bits updated in the register.

16. The memory system of claim 15, wherein the host device is further configured to disable the ECC function of the memory device.

17. The memory system of claim 15, wherein the host device is further configured to access the second portion of the memory array when the ECC function of the memory device is enabled.

18. The memory system of claim 15, wherein the host device is further configured to activate one or more channels coupled to one or more address pins identifying the second portion of the memory array, the one or more address pins separate from a quantity of address pins corresponding to a plurality of memory addresses for the memory array.

19. The memory system of claim 15, wherein the host device is further configured to activate one or more channels coupled to one or more data pins configured to transmit or receive data for the second portion of the memory array, wherein the one or more data pins separate from a quantity of data pins configured to transmit or receive data for the first portion of the memory array.

20. The memory system of claim 15, wherein the host device is further configured to communicate with the memory device for a burst length corresponding to the user data for the first portion and additional user data and/or metadata for the second portion.

* * * * *